Oct. 20, 1931.     L. MULLER     1,827,797

ADJUSTABLE SEARCHLIGHT

Filed Feb. 4, 1931

Inventor:

Patented Oct. 20, 1931

1,827,797

UNITED STATES PATENT OFFICE

LUCIEN MULLER, OF FLORANGE, FRANCE

ADJUSTABLE SEARCHLIGHT

Application filed February 4, 1931, Serial No. 513,431, and in France March 15, 1930.

The present invention relates to an adjustable searchlight for various purposes, and particularly for vehicles and vessels on land and sea and for aircraft.

Owing to its special construction, the searchlight can be quickly rotated at will on a horizontal or vertical plane, or both at the same time, to always adjust its luminous cone exactly in the direction required.

The invention provides a casing rotatably arranged around a vertical stationary stand and carrying in two forked arms the searchlight body which moves about a horizontal axis. The motion of the casing about the stand and that of the searchlight about its horizontal bearing shaft are carried out by means of motor-driven worm gears arranged in the casing or in the searchlight itself.

Figure 1:
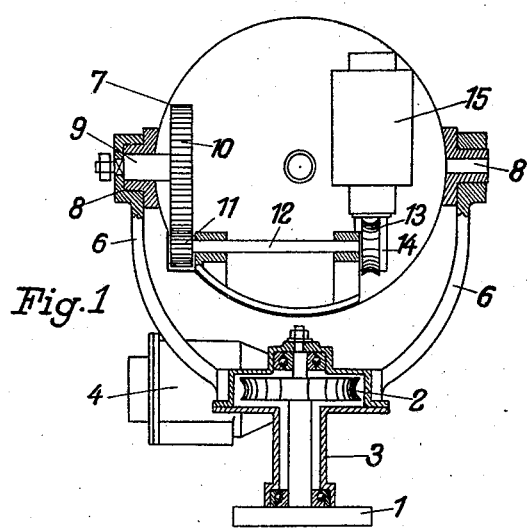
Figure 2:
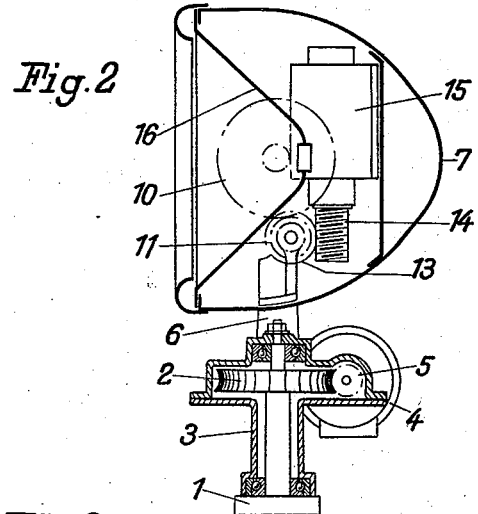
Figure 3:
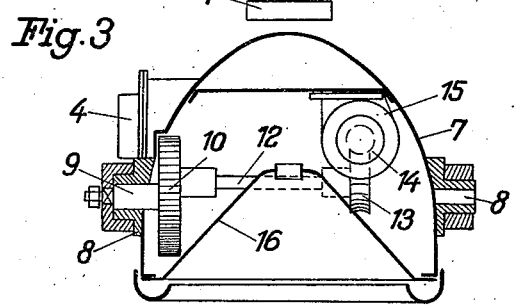

One embodiment of the invention is illustrated in the accompanying drawing, in which Figures 1 and 2 are longitudinal sections of a searchlight according to the invention and shifted 90° relative to one another, and Fig. 3 is a cross section thereof.

Referring to the drawing, 1 is a stationary vertical stand to the top portion of which the cogwheel 2 of a worm gear 2 is secured while the casing 3 is rotatably disposed around the stand 1. The casing 3 carries a small reversible motor 4 the shaft of which carries the worm 5 of the worm gear. Furthermore, on both sides of the casing 3 two forked arms 6 are provided between which the searchlight 7 is held movably. One of the two pins 8 of the searchlight is penetrated by the shaft 9 which is stationarily disposed in the corresponding arm 6 and which carries a toothed rim 10 in mesh with the pinion 11 freely supported on a shaft 12 which, on its other end, carries a freely supported worm wheel 13. The worm 4 in mesh with this wheel is driven by the reversible motor 15 positioned inside the searchlight casing. 16 is the usual reflector of the searchlight in the focus of which the illuminant is disposed.

The two motors 4 and 5 are fed from the source of power of the searchlight lamps with the interposition of a suitable contact device arranged within reach of the driver so that it can be turned one way or the other to suit requirements and thus move the searchlight around the stand 1 to the right or left or raise or lower it around the pins 8. Correspondingly, the luminous cone of the searchlight will be adjusted to the direction desired, which, especially in vehicles and vessels, increases considerably safety in operation.

I claim:—

1. Adjustable searchlight, especially for vehicles and vessels and other purposes, comprising a stationary support, a casing rotatably arranged around the said support, a searchlight, forked arms secured to the said casing to carry the said searchlight, a stationary toothed rim disposed inside the said searchlight and carried by one of the said forked arms, and a pinion adapted to mesh with the said toothed rim.

2. Adjustable searchlight according to claim 1, wherein motors and worm gears are disposed in the casing and searchlights to rotate the casing about the support and the pinion on the toothed rim.

LUCIEN MULLER.